(12) United States Patent
Steen et al.

(10) Patent No.: US 7,273,442 B2
(45) Date of Patent: Sep. 25, 2007

(54) DRIVING ARRANGEMENT FOR MOTOR VEHICLE AND METHOD TO DETERMINE TORQUE TRANSMITTING CHARACTERISTIC FOR AN INTERMEDIATE SHAFT BRAKE IN A GEARBOX INCLUDED IN THE DRIVING ARRANGEMENT

(75) Inventors: Marcus Steen, Angered (SE); Svante Karlsson, Västra Frölunda (SE); Erik Lauri, Mölndal (SE); Helene Panagopoulos, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/551,178

(22) Filed: Oct. 19, 2006

(65) Prior Publication Data
US 2007/0042865 A1    Feb. 22, 2007

Related U.S. Application Data

(63) Continuation of application No. PCT/SE2005/000593, filed on Apr. 22, 2005.

(30) Foreign Application Priority Data
Apr. 22, 2004    (SE) .................................... 0401048

(51) Int. Cl.
*G06F 7/00*    (2006.01)

(52) U.S. Cl. ........................................ 477/172; 701/67
(58) Field of Classification Search ........ 477/170–172; 701/67
See application file for complete search history.

(56) References Cited

U.S. PATENT DOCUMENTS

| 4,223,775 A | * | 9/1980 | Lloyd ........................ 477/172 |
| 4,760,902 A | * | 8/1988 | Bellanger .................. 477/172 |
| 6,770,008 B2 | * | 8/2004 | Shinojima et al. ............ 477/71 |

* cited by examiner

*Primary Examiner*—Ha Ho
(74) *Attorney, Agent, or Firm*—Novak Druce and Quigg LLP

(57) ABSTRACT

Drivetrain for a motor vehicle including an engine (1), a gearbox (9) having an intermediate shaft (11) with intermediate shaft brake (17) and a friction clutch (3) coupled between the engine and the gearbox. A torque sensor (19) is provided, which detects the input torque to the gearbox. The intermediate shaft brake and the clutch are controlled by a control unit (12), which is programmed in predetermined instances, when the gearbox is in the neutral position, the clutch is engaged and the intermediate shaft brake is released, to measure and store the torque loss from the gearbox and then to set the brake to a predetermined level and to register and store the torque increase during the setting until constant torque is attained. This is registered and stored in the control unit together with the time for the torque increase.

9 Claims, 3 Drawing Sheets

DRIVING ARRANGEMENT FOR MOTOR VEHICLE AND METHOD TO DETERMINE TORQUE TRANSMITTING CHARACTERISTIC FOR AN INTERMEDIATE SHAFT BRAKE IN A GEARBOX INCLUDED IN THE DRIVING ARRANGEMENT

CROSS-REFERENCE TO RELATED APPLICATIONS

The present application is a continuation patent application of International Application No. PCT/SE05/00593 filed 22 Apr. 2005 which is published in English pursuant to Article 21(2) of the Patent Cooperation Treaty and which claims priority to Swedish Application No. 0401048-4 filed 22 Apr. 2004. Said applications are expressly incorporated herein by reference in their entireties.

FIELD

The present invention relates to a drivetrain for a motor vehicle that includes at least one engine having an output shaft, a gearbox having an input shaft and at least one intermediate shaft with an intermediate shaft brake, a friction clutch having a first friction element connected to the output shaft and a second friction element connected to the input shaft and an electronic control unit for controlling the intermediate shaft brake and the friction clutch as a function of various control parameters fed into the control unit.

The invention also relates to a method of determining the torque transmission characteristic of an intermediate shaft brake coordinated with at least one intermediate shaft in a gearbox, which has an input shaft and can be driven coupled to at least one engine having an output shaft via a friction clutch, which has a first friction element connected to the output shaft and a second friction element connected to the input shaft. The method consisting in control of the intermediate shaft brake and the friction clutch by means of an electronic control unit as a function of various control parameters fed into the control unit and proceeding on the basis that the engine is started, the gearbox is in the neutral position, the clutch is engaged and the intermediate shaft brake is released.

The present invention also relates to a computer program for performing such a method using a computer.

BACKGROUND

The use of intermediate shaft brakes in automatic stage-geared vehicle gearboxes having at least some non-synchromesh gear stages and an input shaft coupled by way of an automatic friction clutch to an output shaft of an engine is already known. With the aid of a control computer and the vehicle's throttle control, the clutch in a known embodiment is controlled in such a way that when the vehicle is stationary with the engine running, and a gear selector coupled to the control computer is in the neutral position, the clutch is engaged, which means that the intermediate shaft and hence also the gear wheels meshing with the intermediate shaft gear wheels are rotating.

When the vehicle is to start and the gear selector is set to a gear position for selecting the starting gear, the clutch is disengaged. The disengaged gear wheel on the main shaft, by way of which the torque is to be transmitted to the selected gear, must first be braked to a standstill before the gear wheel can be locked to the shaft. If the selected gear is a synchromesh gear, the braking is performed with the aid of associated synchromesh elements, but if the selected gear is a gear with no synchromesh element, the braking is achieved by way of the intermediate shaft being braked to a standstill by the intermediate shaft brake.

However, an intermediate shaft brake can also be used for synchronization, either alone or together with an engine speed adjustment, when shifting between different gears, especially when shifting up. The time taken from the initiation of a gear shift, either when engaging the starting gear or shifting between different gears, until the gear shift is completed is to a large extent influenced by the torque transmission characteristic of the intermediate shaft brake, which is in turn influenced by factors such as temperature, brake lining wear and application and release times.

Insufficient account has hitherto been taken of the variations in the torque characteristic of the intermediate shaft brake as a function of the aforementioned factors, and this has had an effect on the gearshift time. The effect of temperature and wear which results in reduced brake torque have meant that the synchronization sequence and hence the gearshift time have been prolonged.

SUMMARY

An object of the present invention is to provide a drivetrain of the type specified in the introductory part, which makes it possible at predetermined intervals to create a starting point for reliable monitoring of the brake torque and reaction times of the intermediate shaft brake, thereby permitting adjustment of the derivative action of the application and release of the intermediate brake shaft and its application time and in this way achieving optimum rapidity of the gearshift sequence.

According to the invention, this object is achieved in a drivetrain of the type specified in the introductory part in that a torque sensor is provided, which detects the torque on the input shaft and sends a torque-dependent signal to the control unit, and that the control unit is designed, in predefined instances, when the gearbox is in the neutral position, the clutch is engaged and the intermediate shaft brake is released, to register and store the torque measured by the torque sensor.

The derivative action of the application of the intermediate shaft brake can now be calculated in that the control unit is, according to the invention, designed from this starting point: (a) to set the intermediate shaft brake to a predetermined level; (b) to register and store the torque increase measured by the torque sensor during the setting sequence until the torque becomes constant; and (c) to register and store the time for the torque increase and the constant torque.

The derivative action of the release of the intermediate shaft brake can be calculated if the control unit is also, according to the invention, designed from this starting point: (a) to set the intermediate shaft brake to a predetermined level; (b) to release the intermediate shaft brake; and (c) to register and store the torque reduction measured by the torque sensor during the release sequence until the torque is at least approximately equal to the stored torque upon release of the intermediate shaft brake; and (d) to register and store the time for the torque reduction.

A further object of the invention is to provide a simple and reliable method of establishing a starting point for determining a torque transmission characteristic of the intermediate shaft brake in a drivetrain having a gearbox with intermediate shaft brake.

According to the invention, this is achieved by a method of the type specified in the introductory part in that from a starting point in which the engine is started, the gearbox is in the neutral position, the clutch is engaged and the intermediate shaft brake is released, the torque on the input shaft is measured by means of a torque sensor and registered and stored in the control unit.

The derivative action of the application of the intermediate shaft brake can be calculated by a method which according to the invention additionally consists in: (a) setting the intermediate shaft brake to a predetermined level; (b) registering and storing in the control unit the torque increase measured by the torque sensor during the setting sequence and until the torque becomes constant; and (c) registering and storing in the control unit the time for the torque increase and the constant torque.

The derivative action of the release of the intermediate shaft brake can be calculated by a method which according to the invention additionally consists in: (a) setting the intermediate shaft brake to a predetermined level; (b) releasing the intermediate shaft brake; (c) registering and storing in the control unit the torque reduction measured by the torque sensor during the release sequence and until the torque is at least approximately equal to the stored torque upon release of the intermediate shaft brake; and (d) registering and storing in the control unit the time for the torque reduction.

The control unit may be programmed to carry out the procedure described for determining the torque characteristic and reaction times of the intermediate shaft brake at certain intervals or each time the engine is started. In this way, the variations in the torque characteristic and reaction times, which vary as a function of the brake lining wear, temperature changes etc., can be fully monitored so that the swiftest possible synchronization can be achieved for each instance of a gearshift for each individual type of gearbox. Individual adjustment to variations between different gearboxes of the same type is readily-feasible using the described method according to the invention.

BRIEF DESCRIPTION OF THE DRAWINGS

The invention is described in more detail with reference to the exemplary embodiments shown in the drawings attached, in which.

DETAILED DESCRIPTION

Figure 1:
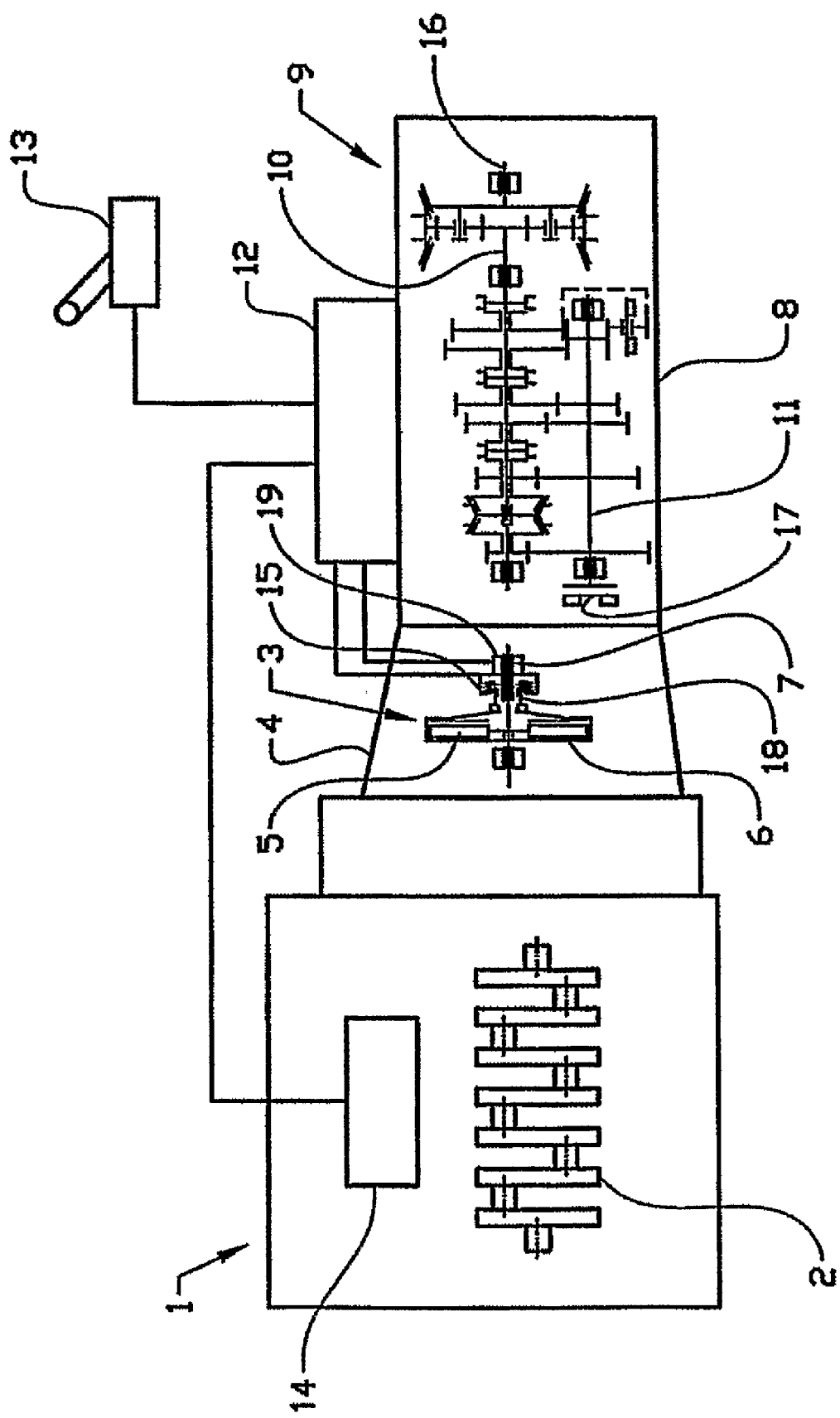
FIG. 1 is a schematic representation of one embodiment of a drivetrain configured according to the invention.

In FIG. 1, a six-cylinder internal combustion engine 6 is shown and which can exemplarily take the form of a diesel engine, the crankshaft 2 of which is coupled to a single dry-plate clutch 3 which is enclosed in a clutch cover 4. A multi-plate clutch may be used instead of a single-plate clutch. The crankshaft 2 is rotationally fixed to the clutch housing 5 of the clutch 3, while the plate 6 thereof is rotationally fixed to an input shaft 7, which is rotatably supported in the housing 8 of a gearbox generally denoted by 9. A main shaft 10 and an intermediate shaft 11 are also rotatably supported in the housing 8.

The gearbox 9 is a known automatic stage-geared vehicle gearbox, which has a non-synchromesh basic gearbox with a synchromesh splitter group on the input side and a synchromesh range group on the output side. Gear shifting is controlled by an electronic transmission control unit 12, which comprises a microcomputer, as a function of signals representing various engine and vehicle data fed into the control unit, when a gear selector 13 coupled to the control unit is in its automatic position. When the gear selector 13 is in the manual gearshift position, gearshifts are performed at the driver's command. The transmission control unit 12 communicates with an engine control unit 14 and together with the latter also controls the fuel injection; that is to say, the engine speed, as a function of the accelerator pedal position and the pressure medium supply to an operating cylinder, for example a pneumatic piston-cylinder arrangement, by means of which the clutch is engaged and released.

The transmission control unit 12 is programmed in a known manner so that it keeps the clutch engaged when the vehicle is stationary with the engine running and the gear selector 13 is in the neutral position. This means that the engine drives the gearbox input shaft 7 and hence also its intermediate shaft 11, whilst the gearbox output shaft 16 is disengaged. The control unit 12 is programmed so that when the vehicle is stationary and the gear selector 13 is moved to a gear position, either to the automatic position or to a position with gear selected by the driver, the clutch is first disengaged and the intermediate shaft 11 then braked to a standstill by means of a brake arrangement 17, which is coordinated with the intermediate shaft and which may be an intermediate shaft brake known in the art and controlled by the control unit 12, for example an electromagnetic brake or a brake which has a pressure medium-controlled application and release operating device (not shown in more detail).

The synchronization time when shifting either from neutral to starting gear when the intermediate shaft 11 is to be braked to a standstill, or from an existing gear to another gear, for example a higher gear when the intermediate shaft is to be braked to the speed of a higher gear for synchronization, naturally depends not only on the brake torque of the intermediate shaft but also on the inevitable activation delay from the control unit 12 emitting a command signal to apply the brake to the time that a predetermined brake torque has been attained, and on the deactivation delay from the control unit 12 emitting a signal to release the brake to the time that the brake torque from the intermediate shaft brake has fallen to zero.

Figure 2:
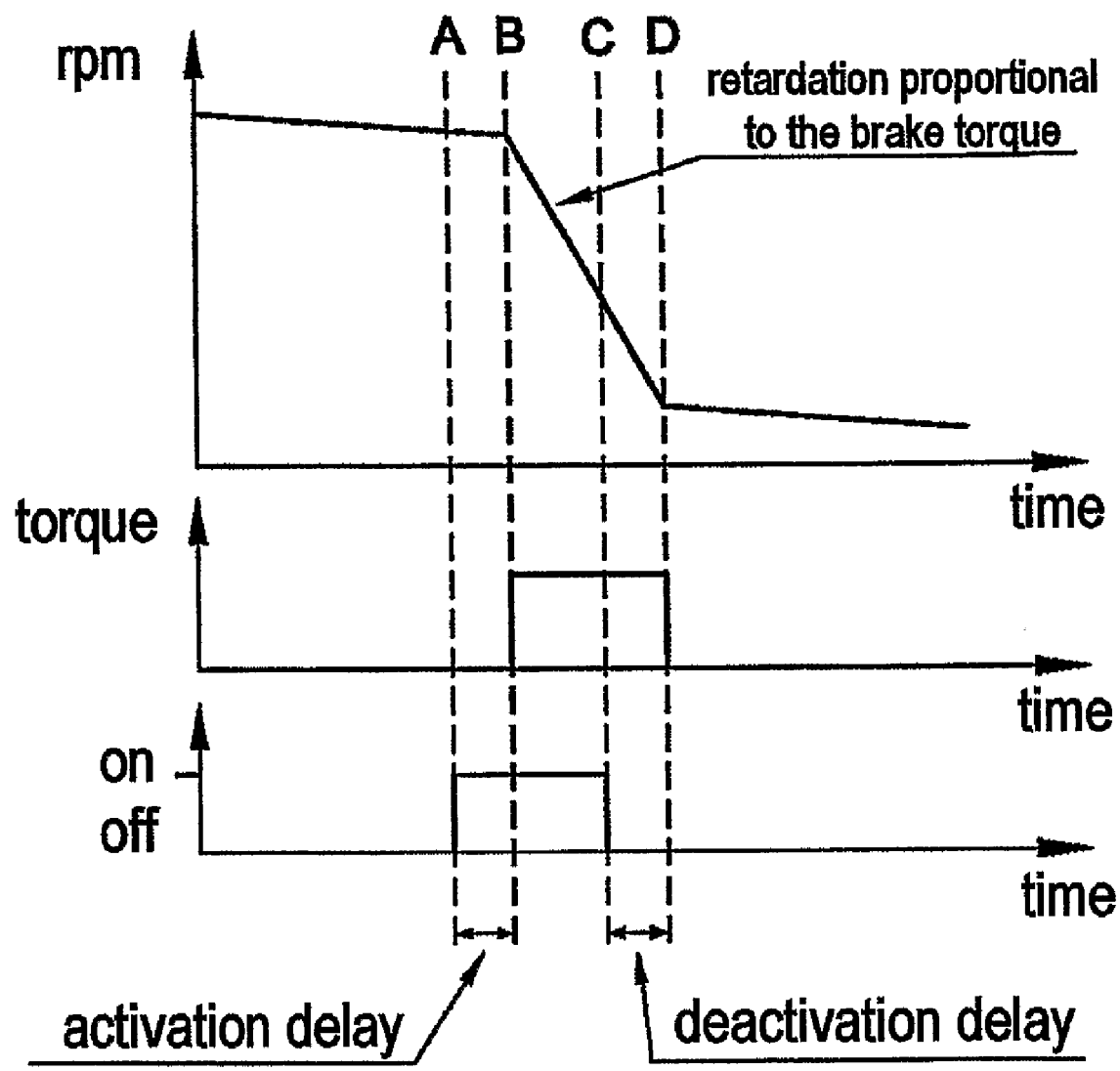
FIG. 2 is a diagram illustrating the reaction times and brake torque of the intermediate shaft and the intermediate shaft brake when braking, for example when changing gear.

The sequence is illustrated in FIG. 2 in which the line A marks the time at which the brake is activated and B marks the time at which a predetermined constant brake torque was attained. The period of time between A and B therefore constitutes the activation delay. Similarly the line C marks the time at which the brake is deactivated and D marks the time at which the brake torque dropped to zero. Over the period of time between B and D the torque is constant, whilst the period of time between C and D constitutes the deactivation delay.

The brake torque characteristic of a new brake is known and with this and other factors as a guide it is possible to calculate the required derivative action for activation and deactivation, in order to compensate for the aforementioned delay. Over time, however, the brake wears and both the brake torque characteristic and the delay times vary, which affects the gearshift quality. A good method of charting and compensating for these changes and also for temperature variations has hitherto been unforthcoming.

By using a torque sensor 19 according to the present invention, which detects the torque transmitted from the engine to the input shaft 7 via the clutch 3 and delivers a signal varying as a function of this torque to the control unit 12, it is easily possible whilst the vehicle is in operation to fully monitor the changes in the torque characteristic and reaction times of the brake and to compensate for these.

Thus in one embodiment the control unit 12 is programmed in selected instances, when the engine 1 is started, the gearbox 9 is in its neutral position, the clutch 3 is engaged and the intermediate shaft brake 17 is released, to measure and store the torque loss from the gearbox and then to set the intermediate shaft brake to a predetermined level, for example to maximum brake torque, and to register and store the torque increase measured by the torque sensor 19 during the setting sequence until constant torque is attained. This is registered and stored as is the time for the torque increase. The intermediate shaft brake 17 is then deactivated and the torque reduction, measured by the torque sensor 19 during the deactivation sequence down to at least approximately the torque loss, is registered and stored together with the time for this.

Through such constant monitoring of the torque characteristic and reaction times of the intermediate shaft brake 17 it is possible to optimize the derivative action for activation and deactivation of the brake as well as the period of time at constant torque that is required for swiftest possible synchronization.

The invention can also be used as a diagnostic aid to the functioning of the intermediate shaft brake. The control unit may be designed to emit a signal indicating a defect in the intermediate shaft brake, if the brake torque characteristic lies outside predefined limits stored in the control unit.

Figure 3:
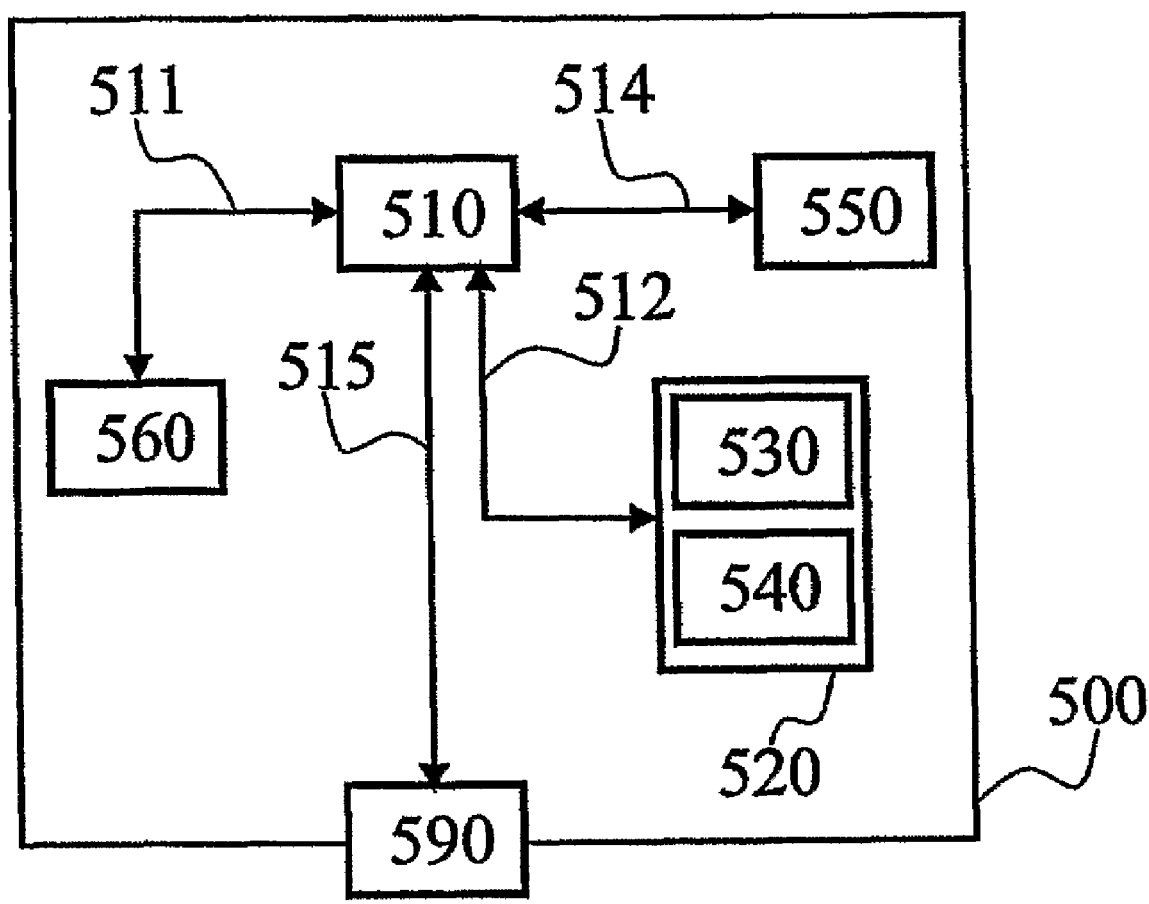
FIG. 3 illustrates an embodiment of the invention.

FIG. 3 shows an apparatus 500 according to one embodiment of the invention, comprising a non-volatile memory 520, a processor 510 and a read/write memory 560. The memory 520 has a first memory part 530, in which a computer program for controlling the apparatus 500 is stored. The computer program in the memory part 530 for controlling the apparatus 500 may be an operating system.

The apparatus 500 may be incorporated into a control unit, for example, such as the control unit 12. The data-processing unit 510 may comprise a microcomputer, for example.

The memory 520 also has a second memory part 540, in which is stored a program for controlling the clutch, gearbox and intermediate shaft brake according to the invention. In an alternative embodiment the program for controlling the clutch, gearbox and intermediate shaft brake is stored on a separate, non-volatile data storage medium 550, such as a CD, for example, or a replaceable semiconductor memory. The program may be stored in an executable form or in a compressed state.

Where the data-processing unit 510 is described below as running a special function, it should be clearly understood that the data-processing unit 510 runs a special part of the program that is stored in the memory 540 or a special part of the program that is stored on the non-volatile recording medium 550.

The data processing unit 510 is adapted for communication with the memory 550 by means of a data bus 514. The data processing unit 510 is also adapted for communication with the memory 520 by means of a data bus 512. The data processing unit 510 is furthermore adapted for communication with the memory 560 by means of a data bus 511. The data processing unit 510 is also adapted for communication with a data port 590 by means of a data bus 515.

The method according to the invention can be performed by the data processing unit 510 in that the data processing unit 510 runs the program which is stored in the memory 540 or the program which is stored on the non-volatile recording medium 550.

What is claimed is:

1. A drivetrain for a motor vehicle comprising:
   at least one engine having an output shaft;
   a gearbox having an input shaft;
   at least one intermediate shaft with an intermediate shaft brake;
   a friction clutch with a first friction element connected to the output shaft;
   a second friction element connected to the input shaft;
   a torque sensor that detects the torque on the input shaft and sends a torque-dependent signal to an electronic control unit; and
   said electronic control unit programmed to control the intermediate shaft brake and the friction clutch as a function of various control parameters fed into the control unit and said control unit is programmed, in predefined instances when the engine is started, the intermediate shaft brake is released, the gearbox is in the neutral position and the clutch is engaged, to register and store the torque measured by the torque sensor.

2. The drivetrain as recited in claim 1, wherein the control unit is programmed, in predefined instances when the intermediate shaft brake is released, to set the intermediate shaft brake to a predetermined level, to register and store the torque increase measured by the torque sensor during the setting sequence until the torque becomes constant and to register and store the time for the torque increase and the constant torque.

3. The drivetrain as recited in claim 1, wherein the control unit is programmed, in predefined instances when the intermediate shaft brake is released, to set the intermediate shaft brake to a predetermined level, to release the intermediate shaft brake, to register and store the torque reduction measured by the torque sensor during the release sequence until the torque is at least approximately equal to the stored torque upon release of the intermediate shaft brake and to register and store the time for the torque reduction.

4. A method of establishing a starting point for determining a torque transmission characteristic of an intermediate shaft brake coordinated with at least one intermediate shaft in a gearbox, which has an input shaft and can be driven coupled to at least one engine having an output shaft via a friction clutch, which has a first friction element connected to the output shaft and a second friction element connected to the input shaft, said method comprising:
   controlling the intermediate shaft brake and the friction clutch by means of an electronic control unit as a function of various control parameters fed into the control unit; and
   proceeding from the starting point in which the engine is started and the gearbox is in the neutral position, the clutch is engaged and the intermediate shaft brake is released and the torque on the input shaft is measured by means of a torque sensor and registered and stored in the control unit.

5. The method as recited in claim 4, wherein in predefined instances, when the intermediate shaft brake is released, the intermediate shaft brake is set to a predetermined level, the torque increase measured by the torque sensor during the setting sequence until the torque becomes constant is registered and stored in the control unit, the time for the torque increase and the constant torque are registered and stored in the control unit, the intermediate shaft brake is released.

6. The method as recited in claim 4, wherein in predefined instances, when the intermediate shaft brake is released, the intermediate shaft brake is set to a predetermined level, the intermediate shaft brake is released, the torque reduction measured by the torque sensor during the release sequence until the torque is at least approximately equal to the stored torque on release of the intermediate shaft brake is registered and stored in the control unit, the time for the torque reduction is registered and stored in the control unit.

7. The method as recited in claim 4, further comprising said method being conducted using a computer program comprising program code that executes the steps of the method when said computer program is executed on a computer.

8. The method as recited in claim 4, further comprising said method being conducted using program code comprising program code that executes the steps of the method when said computer program is executed on a computer.

9. The method as recited in claim 4, further comprising said method being conducted using a computer program product directly loadable into an internal memory of a computer and comprising a computer program that executes the steps of the method when said computer program is executed on the computer.

* * * * *